United States Patent
Liu

(10) Patent No.: US 11,302,252 B2
(45) Date of Patent: Apr. 12, 2022

(54) METHOD AND APPARATUS FOR IMPROVING DISPLAY EFFECT OF DISPLAY SCREEN, TERMINAL DEVICE

(71) Applicant: BEIJING XIAOMI MOBILE SOFTWARE CO., LTD., Beijing (CN)

(72) Inventor: Jinshan Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/131,724

(22) Filed: Dec. 22, 2020

(65) Prior Publication Data

US 2021/0398483 A1  Dec. 23, 2021

(30) Foreign Application Priority Data

Jun. 19, 2020  (CN) .......................... 202010565985.8

(51) Int. Cl.
  *G09G 3/3233*  (2016.01)
  *G06F 3/041*  (2006.01)

(52) U.S. Cl.
  CPC .......... *G09G 3/3233* (2013.01); *G06F 3/041* (2013.01); *G09G 2320/0233* (2013.01)

(58) Field of Classification Search
  CPC .......... G09G 3/3233; G09G 2320/0233; G06F 3/041
  See application file for complete search history.

(56) References Cited

U.S. PATENT DOCUMENTS

| | | | | |
|---|---|---|---|---|
| 8,866,807 | B2 * | 10/2014 | Kato ................... | G09G 3/3225 345/212 |
| 9,105,231 | B2 * | 8/2015 | Ebisuno ............... | G09G 3/3258 |
| 2002/0180721 | A1 * | 12/2002 | Kimura ............... | H01L 27/3269 345/211 |
| 2012/0327066 | A1 * | 12/2012 | Kato ................... | G09G 3/3225 345/212 |
| 2013/0162622 | A1 * | 6/2013 | Ebisuno ............... | G09G 3/3208 345/212 |

FOREIGN PATENT DOCUMENTS

EP  2733691 A1  5/2014

OTHER PUBLICATIONS

European Patent Office, Extended European Search Report (EESR) in Application No. 21151406.2 dated Jun. 25, 2021.

* cited by examiner

*Primary Examiner* — Jeff Piziali
(74) *Attorney, Agent, or Firm* — Syncoda LLC; Feng Ma

(57) ABSTRACT

A method for improving a display effect of a display screen includes: determining a current voltage loss of a first electrode at a preset area of the display screen when the preset area of the display screen is switched from a first state to a second state; obtaining a preset drain voltage for a second electrode at the preset area of the display screen; and determining a target drain voltage of the second electrode of the display screen based on the current voltage loss and the preset drain voltage, to enable a voltage difference between the first electrode and the second electrode of the display screen to be equal to a preset voltage difference.

19 Claims, 7 Drawing Sheets

METHOD AND APPARATUS FOR IMPROVING DISPLAY EFFECT OF DISPLAY SCREEN, TERMINAL DEVICE

CROSS-REFERENCE TO RELATED APPLICATIONS

This application claims priority to Chinese Patent Application No. 202010565985.8 filed on Jun. 19, 2020, the disclosure of which is hereby incorporated by reference in its entirety.

BACKGROUND

Typical display screens of terminal devices such as mobile phones are liquid-crystal display (LCD) screens. As technologies develop, more and more terminal devices are adopting organic light-emitting diode (OLED) display screens. An OLED display screen has a different display mode compared with that of an LCD display screen. The OLED display screen can emit light by itself when powered on.

SUMMARY

Various embodiments of the present disclosure provide a method and an apparatus for improving a display effect of a display screen, a terminal device and a medium.

In a first aspect, the present disclosure provides a method for improving a display effect of a display screen, which is applicable for a terminal device including an OLED display screen. The method includes: determining a current voltage loss of a first electrode at a preset area of the display screen when the preset area of the display screen is switched from a first state to a second state, in which a pixel voltage of the first electrode in the first state is less than a pixel voltage of the first electrode in the second state; obtaining a preset drain voltage for a second electrode at the preset area of the display screen, in which the preset drain voltage for the second electrode is a preset drain voltage of the preset area of the display screen in the second state; and determining a target drain voltage of the second electrode of the display screen based on the current voltage loss and the preset drain voltage, and adjusting a current drain voltage of the second electrode to the target drain voltage to enable a voltage difference between the first electrode and the second electrode of the display screen to be equal to a preset voltage difference.

In a second aspect, the present disclosure provides an apparatus for improving a display effect of a display screen, which is applicable for a terminal device including an OLED display screen. The apparatus includes: a first determining module, an obtaining module and a second determining module.

The first determining module is configured to, determine a current voltage loss of a first electrode at a preset area of the display screen when the preset area of a display screen is switched from a first state to a second state, in which a pixel voltage of the first electrode in the first state is less than a pixel voltage of the first electrode in the second state.

The obtaining module is configured to obtain a preset drain voltage for a second electrode at the preset area of the display screen, in which the preset drain voltage for the second electrode is a preset drain voltage of the preset area of the display screen in the second state.

The second determining module is configured to determine a target drain voltage of the second electrode of the display screen based on the current voltage loss and the preset drain voltage, and adjust a current drain voltage of the second electrode to the target drain voltage to enable a voltage difference between the first electrode and the second electrode of the display screen to be equal to a preset voltage difference.

In a third aspect, the present disclosure provides a terminal device including the above apparatus for improving a display effect of a display screen.

In a fourth aspect, the present disclosure provides a terminal device, and the terminal device includes a processor and memory configured to store instructions executable by the processor. The processor is configured to execute the above method for improving a display effect of a display screen.

In a fifth aspect, the present disclosure provides a non-transitory computer-readable storage medium storing instructions, in which when the instructions in the storage medium are executed by a processor of a terminal device, the terminal device is caused to execute the above method for improving a display effect of a display screen.

The above general description and the following detailed description are only exemplary and explanatory, and are not to limit scope of the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Organic light-emitting diodes (OLED) display screens have excellent characteristics such as self-luminescence, high contrast, thin thickness, wide viewing angle, and wide temperature range. Therefore, more and more high-end mobile phones, tablets, TVs and other terminal devices adopt OLED display screens.

A display mode of the OLED display screen is different from that of the conventional LCD display screen. Organic material inside the OLED display screen emits light by itself when the OLED display screen is powered on. In the process of a OLED display screen illuminating and displaying, if a screen of the terminal device is switched or dragged, smear phenomenon will occur, especially when the display screen is switched from a black screen to a white screen, where the current changes greatly, it is easier to see the smear phenomenon on the display screen, which may affect user experience.

In order to better solve the above-mentioned smear problem occurring on the display screen, some causes of the smear phenomenon are studied in combination with structures and principles of an OLED display screen.

Figure 1:
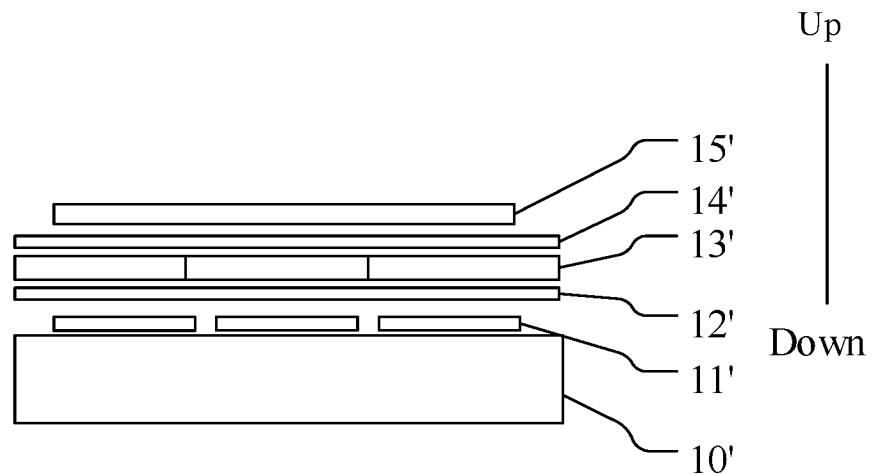
FIG. 1 is a schematic diagram of an OLED display screen.

As illustrated in FIG. 1, a structure of the OLED display screen can include, from bottom to top, a substrate 10', an anode 11', a hole transport layer 12', an organic light emitting layer 13', an electron transport layer 14' and a cathode 15'. The substrate 10' (for example, transparent glass) is configured to support the entire OLED display screen. The anode 11' (indium tin oxide ITO) eliminates electrons (i.e. increases electron "holes") when current flows through the device. The hole transport layer 12' is composed of organic molecule material, and the hole transport layer 12' may transport "holes" from the anode. The organic light-emitting layer 13' is composed of organic molecule material, and is configured to realize a light-emitting process of the display screen. The electron transport layer 14' is composed of organic molecule material, and the electron transport layer 14' may transport "electrons" from the cathode. The cathode 15' (metal) is configured to inject electrons into the circuit when there is current flowing in the device.

When the OLED display screen is powered on, the cathode 15' generates electrons and the anode 11' generates holes. Under the action of electric field force, the electrons pass through the electron transport layer 14', and the holes pass through the hole transport layer 12'. Electrons and holes combine in the organic light-emitting layer 13' to form excitons. The excitons of the organic light-emitting layer 13' excite luminescence molecules, which increases energy of the luminescence molecules to enable the luminescence molecules to be in an excited state. The luminescence molecules in the excited state are unstable, and the luminescence molecules may release energy to go back to a stable state, and the released energy is emitted in the form of visible light. As a result, the organic light-emitting layer 13' emits light. The organic light-emitting layer 13' may be provided with various types of organic thin films to form a color picture, which can be seen on the transparent substrate 10' and the anode 11'. A brightness or an intensity of the generated visible light depends on a magnitude of the drive current applied, and the greater the drive current, the higher the brightness of the light.

Figure 2:
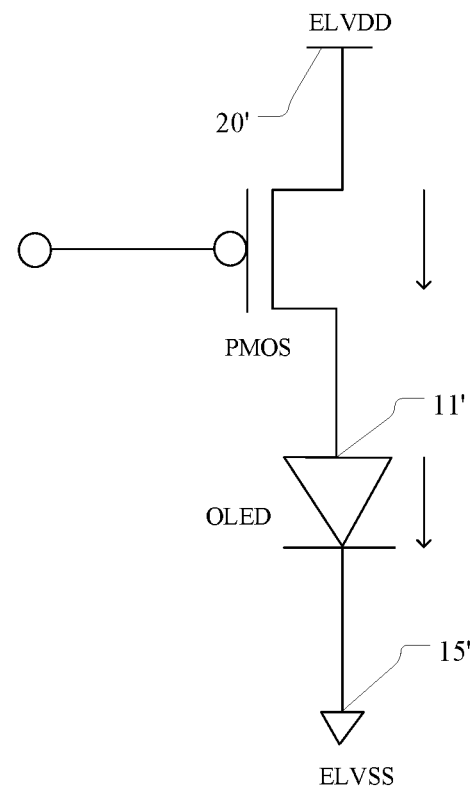
FIG. 2 is a schematic diagram of a connection circuit of an OLED display screen.

For an active-matrix OLED (AMOLED) display screen, the OLED display screen is current-driven, for example, by means of a gate of a MOS transistor. Each pixel of the display screen may be equipped with a MOS transistor (field effect transistor) with a switching function. As illustrated in FIG. 2, a drain 20' of the MOS transistor may be connected to an external power source (such as a DC-DC terminal of the terminal device). A process of driving by a gate of the MOS transistor can be understood as a charging and discharging process of an input capacitor (gate/pixel electrode capacitor) of the MOS transistor by the external power source. When a gate/pixel electrode 21' reaches a preset voltage, the MOS transistor is turned on. By controlling on/off state of the MOS transistor, the magnitude of the drive current flowing through each pixel or each pixel area of the OLED device can be controlled to determine the brightness of the display.

In some situations, the pixel voltage of the gate/pixel electrode may be controlled by a display driver IC. The display brightness of the display screen or the pixel of the display screen is related to the drive current ID, and the drive current ID is related to a voltage difference between a pixel voltage Vdata of the gate/pixel electrode and a drain voltage ELVDD, for example, following $ID \propto (Vdata-ELVDD)^2$ which is derived according to the structure of the OLED display device and a current characteristic curve, that is, the drive current is proportional to a square of the voltage difference.

In some situations, during use of the MOS transistor, due to the hysteresis effect of the MOS transistor (which cannot quickly enter the on/off state), the drive current passing through the display screen is insufficient, such that the display screen presents a smear phenomenon when displaying the picture. Especially, when the display screen is switched from a black picture to a white picture, the drive current (brightness) changes greatly. Due to large loading of the white picture, the pixel voltage when the white picture is displayed could not reach the preset pixel voltage Vdata, that is, the pixel voltage has a voltage drop, such that the drive current when the white picture is actually displayed could not reach the preset drive current. Therefore, the brightness of a first frame of the white picture could not reach a target brightness. In this case, smear phenomenon occurs visually.

Figure 3:
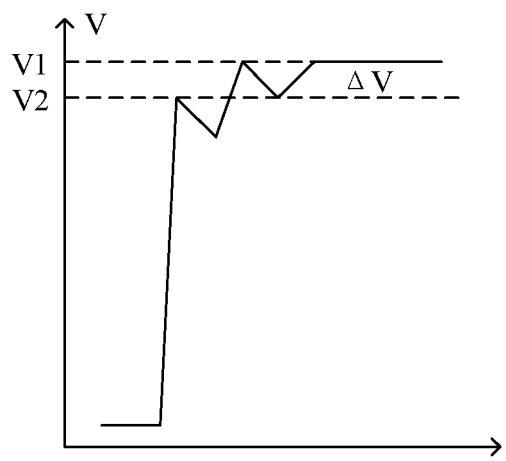
FIG. 3 illustrates a relation between a change in display of a screen and a voltage.

For example, as illustrated in FIG. 3, the preset pixel voltage of the gate/pixel electrode for displaying the white picture may be Vdata=V1, and in the process of switching from the black picture to the white picture, the pixel voltage changes to V2 when the white picture is actually displayed due to the large loading of the white picture and the hysteresis effect of the MOS transistor (current supply is not timely). There is a voltage drop in the pixel voltage when displaying the white picture, and the voltage drop is ΔV=V1−V2. The drive current when the white picture is actually displayed cannot reach the preset drive current, such that the brightness displayed in the first frame of the white picture could not reach the target brightness. In this case, smear phenomenon occurs.

Figure 4:
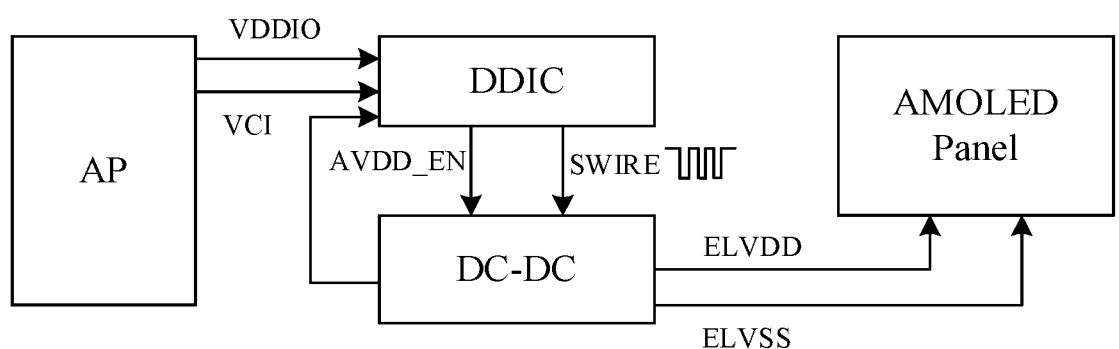
FIG. 4 is a schematic diagram showing a method of drive an OLED display screen.

In some situations, a driving method of the OLED display screen is illustrated in FIG. 4, and the display driver IC (DDIC) is connected to a power supply chip (DC-DC). The DDIC controls the power supply chip to provide a preset drain voltage for the display screen, and the preset drain voltage ELVDD may be set to a fixed value (for example, 4.6V). The DDIC is set with a pixel voltage (of a gate/pixel electrode) adaptive to the preset display brightness. When the brightness of the display screen needs to be adjusted, the DDIC adjusts the magnitude of the pixel voltage by adjusting the number of pulses of a SWIRE (square wave) signal. However, the SWIRE signal is pre-burned and written into the DDIC. Even if there is a voltage drop in the pixel voltage corresponding to a certain display picture, the pixel voltage may not be adjusted timely in some technologies, leading to the smear of the display screen, thereby adversely affecting the user experience.

To solve the above technical problems, various embodiments of the present disclosure provide a method for improving a display effect of a display screen. The method includes: when a preset area of the display screen is switched from a first state to a second state, determining a current voltage loss of a first electrode at the preset area of the display screen, in which a pixel voltage of the first electrode in the first state is less than a pixel voltage of the first electrode in the second state; obtaining a preset drain voltage for a second electrode at the preset area of the display screen; and determining a target drain voltage of the second electrode of the display screen according to the current voltage loss and the preset drain voltage, to enable a voltage difference between the first electrode and the second electrode of the display screen to be equal to a preset voltage difference. With the method of the present disclosure, the current voltage loss of the first electrode may be determined when the state of the preset area of the display screen changes, and the voltage of the second electrode is adaptively adjusted according to the voltage loss of the first electrode. In this way, when a state change occurs, the voltage difference between the two electrodes corresponding to the preset area of the display screen remains at the preset voltage difference, so that drive current of the display screen is sufficient to maintain consistency of a display picture to avoid smear phenomenon.

Figure 5:
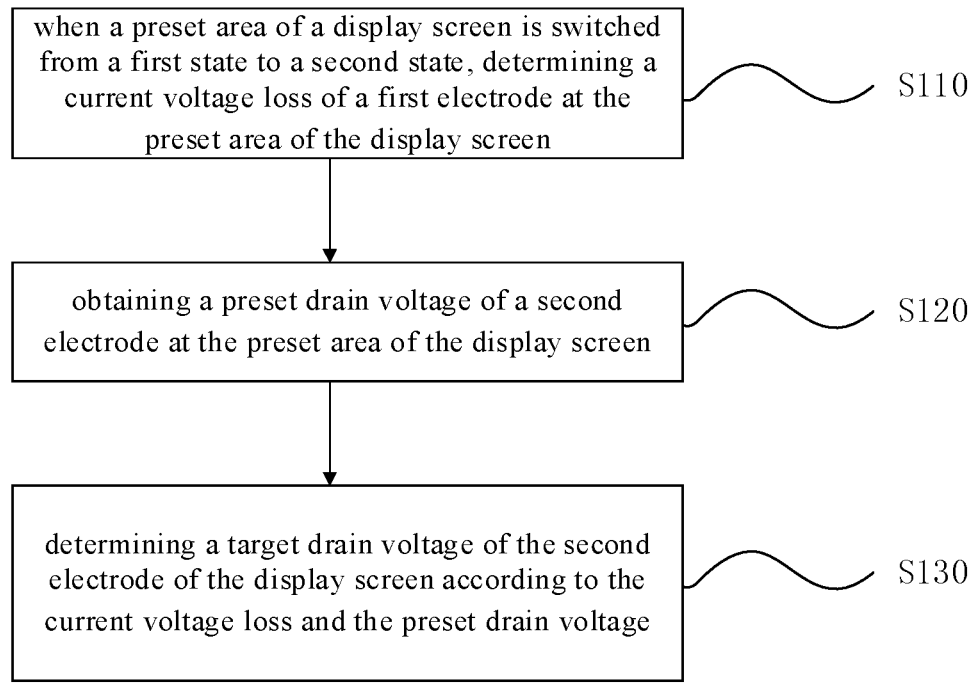
FIG. 5 is a flowchart of a method according to some embodiments.

In some embodiments, the method in this embodiment is applicable to a terminal device including an OLED display screen. The terminal device may be a portable electronic device such as a notebook computer, a mobile phone, a tablet computer, and a TV. As illustrated in FIG. 5, the method of this embodiment includes the following steps.

At S110, when a preset area of a display screen is switched from a first state to a second state, a current voltage loss of a first electrode at the preset area of the display screen is determined. A pixel voltage of the first electrode in the first state is less than a pixel voltage of the first electrode in the second state.

At S120, a preset drain voltage for a second electrode at the preset area of the display screen is obtained. The preset drain voltage for the second electrode refers to a preset drain voltage of the preset area of the display screen in the second state.

At S130, a target drain voltage of the second electrode of the display screen is determined according to the current voltage loss and the preset drain voltage, and a current drain voltage of the second electrode is adjusted to the target drain voltage to enable a voltage difference between the first electrode and the second electrode of the display screen to be equal to a preset voltage difference.

At S110, the preset area of the display screen may be, for example, one pixel, a pixel area containing one row/column of pixels, or a pixel area containing multiple rows/columns of pixels of the display screen, or the display area of the entire display screen. For example, the first state may be a state in which the preset area of the display screen displays pictures with a first brightness or in a first color. The second state may be, for example, a state in which the preset area of the display screen displays pictures with a second brightness or in a second color. The first electrode at the preset area of the display screen refers to: the gate/pixel electrode of the MOS transistor corresponding to the preset area. In this embodiment, one MOS transistor may be provided in the preset area of the display screen. In other embodiments, one MOS transistor may also be provided for each pixel, and when the voltage of the corresponding electrode at the preset area is adjusted, the MOS transistor of each pixel is adjusted synchronously. The current voltage loss of the first electrode refers to: the current voltage drop of the gate/pixel electrode at the preset area of the display screen. The pixel voltage of the first electrode in the first state being less than the pixel voltage of the first electrode in the second state means that the pixel voltage of the first electrode at the preset area in the first state is less than the pixel voltage of the first electrode at the preset area in the second state. The corresponding scenario may be: the display brightness of the preset area in the first state is less than the display brightness of the preset area in the second state, for example, the preset area displays the black picture in the first state, and preset area displays the white picture in the second state.

At S120, the second electrode at the preset area of the display screen refers to the drain of the MOS transistor corresponding to the preset area. In this step, the preset drain voltage of the second electrode at the preset area refers to the preset drain voltage corresponding to the preset area of the display screen in the second state, that is, preset value ELVDD.

Figure 6:
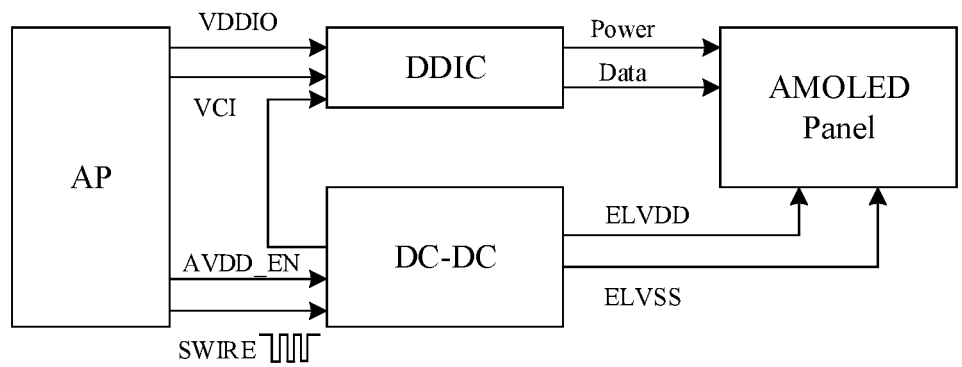
FIG. 6 is a schematic diagram showing how to drive an OLED display screen according to some embodiments.

At S130, as illustrated in FIG. 6, a main control unit AP (or CPU) of the terminal device is not only connected to the DDIC, but also to the DCDC, that is, the AP may control an output voltage of the DCDC. After determining the current voltage loss of the first electrode and the preset drain voltage for the second electrode, due to inconvenience of adjusting the pixel voltage of the first electrode in time, in this step, the target drain voltage of the second electrode of the display screen is determined according to the current voltage loss of the first electrode, and the AP adjusts the voltage output to the DC-DC timely, to enable the drain voltage (ELVDD) finally output from the DC-DC to the display screen to be the target drain voltage.

In this embodiment, when there is a voltage drop on the first electrode, a compensation is applied to the voltage of the second electrode, to enable the voltage difference between the first electrode and the second electrode to be equal the preset voltage difference. The preset voltage difference corresponds to the drive current corresponding to the preset brightness, thereby ensuring that the drive current meets a brightness requirement of the display picture. In this embodiment, it is understood that the AP of the terminal device also issues a control instruction to the DDIC, and the DDIC receives the control instruction and drives the display screen to display in a preset manner and effect.

In this embodiment, as illustrated in FIG. 6, the AP issues the control instruction and sends image data to be displayed, and the DDIC receives the control instruction and the image data to be displayed. When the AP sends the image data to be displayed, it is determined whether there is a scene change in the image data that causes the drive current of the preset area of the display screen to change significantly, for example, whether there is a scene transition having a large change in brightness, for example, form a black picture to a white picture. For another example, it is determined whether there is a large change in the display interface in response to a large change in brightness when the user performs drag operations (for example, when sliding on a setting bar of a phone).

When there is a scene transition that greatly changes the drive current of the display screen, the AP adjusts the magnitude of the voltage output to the DC-DC by adjusting the number of pulses of the SWIRE (square wave) signal, that is, to change the magnitude of the voltage (drain voltage) output from the DC-DC to the second electrode corresponding to the preset area of the display screen. Therefore, when the pixel voltage of the first electrode has a voltage drop, the drain voltage of the second electrode is adjusted adaptively to ensure that the voltage difference between the pixel voltage and the drain voltage is unchanged. For example, when the pixel voltage Vdata decreases, the ELVDD voltage is adjusted to decrease at the same time. According to $ID \propto (Vdata-ELVDD)^2$, when the voltage difference between the pixel voltage and the drain voltage remains unchanged, the drive current in the preset area of the display screen remains constant, and finally, the brightness of the display screen in the preset area is consistent, thereby effectively avoiding the smear phenomenon. In addition, it is worth noticing that the pixel voltage Vdata of the first electrode (for example, the pixel voltage V1 or the pixel voltage V2 after the voltage drop) is always greater than the drain voltage ELVDD of the first electrode.

In an example, assume that the first state is a state in which all the display areas of the display screen display the black picture (black screen), the second state is a state in which all the display areas of the display screens display the white picture. When the display screen is switched from the black picture to the white picture, the brightness of the display screen changes from the lowest to the highest. Since the pixel voltage Vdata of the first electrode has a voltage drop, for example, the current voltage loss is ΔV, the pixel voltage of the first electrode at this time is Vdata-ΔV. In order to ensure that when the display screen is switched to the white picture, the brightness of the first frame of the white picture also reaches the preset brightness, it is confirmed that the current adjustment voltage of the second electrode is ELVDD-ΔV to effectively ensure the consistency of the displayed picture to avoid the smear problem in the process of switching form the black picture to the white picture.

In another example, assume that the first display state is a state in which a pixel display area containing one row of pixels of the display screen displays the black picture (or blue picture), and the second state is a state in which the pixel display area of the display screen displays the white picture (or red picture), when the user slides the display interface, the pixel display area is switched from the black picture (or blue picture) to the white picture (or red picture), and the display brightness of the pixel display area of this row changes from low to high. In order to avoid the smear phenomenon after switching the picture, the current adjustment voltage information of the second electrode corresponding to the pixel display area of the row is adjusted by a process referring to the above example.

Figure 7:
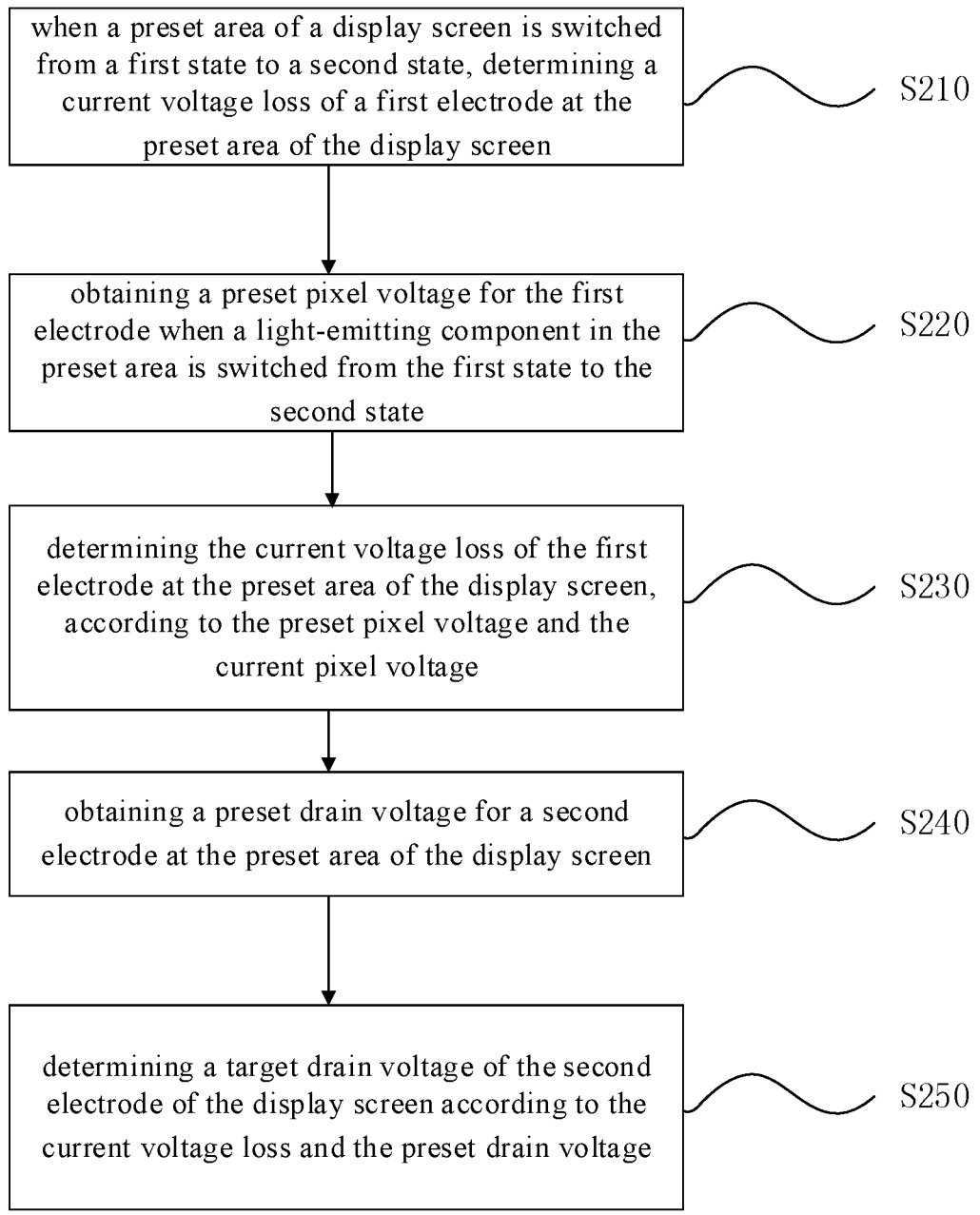
FIG. 7 is a flowchart of a method according to some embodiments.

In some embodiments, as illustrated in FIG. 7, the method in this embodiment includes the following steps.

At S210, a preset pixel voltage for the first electrode is obtained when a light-emitting component in the preset area is switched from the first state to the second state.

At S220, a current pixel voltage of the first electrode is obtained when the light-emitting component in the preset area is switched from the first state to the second state.

At S230, a current voltage loss of the first electrode at the preset area of the display screen is determined according to the preset pixel voltage and the current pixel voltage.

At S240, a preset drain voltage for the second electrode at the preset area of the display screen is obtained.

At S250, a target drain voltage of the second electrode of the display screen is determined according to the current voltage loss and the preset drain voltage, to enable a voltage difference between the first electrode and the second electrode of the display screen to be equal a preset voltage difference.

At S210, the light-emitting component may be, for example, an organic light-emitting layer. The light-emitting component in the preset area is switched from the first state to the second state as follows, the organic light-emitting layer in the preset area may be switched from a first display brightness to a second display brightness. For example, when the preset area is switched from the black picture to the white picture, the corresponding light-emitting component may be switched from non-luminescence to a luminescence state with the highest brightness. The preset pixel voltage for the first electrode may be the preset pixel voltage when the light-emitting component in the preset area reaches the second state, for example, the preset pixel voltage for displaying the white picture is Vdata. The preset pixel voltage for the first electrode may be a preset voltage corresponding to a preset display brightness set or stored according to the image data. The preset pixel voltage information may be calculated and determined by the DDIC based on the image data, which is obtained by the AP of the terminal device from the DDIC; or the AP of the terminal device directly obtains the pre-stored preset pixel voltage information according to the image data.

At S220, the current pixel voltage of the first electrode may be: the current pixel voltage measured by a voltage testing device at the first electrode corresponding to the preset area.

At S230, due to the heavy loading of the white picture and the hysteresis effect of the MOS transistor, the current pixel voltage cannot reach the preset pixel voltage Vdata, that is, having a voltage drop with respect to the preset pixel voltage. The difference between the preset pixel voltage and the current pixel voltage is determined as the current voltage loss ΔV of the first electrode of the display screen.

At S250, the drain voltage is adjusted according to the current voltage loss, for example, a difference between the preset drain voltage ELVDD and the current voltage loss ΔV may be determined as the target drain voltage ELVDD-ΔV, so that the voltage difference between the first electrode and the second electrode of the display screen is equal to the preset voltage difference.

Figure 8:
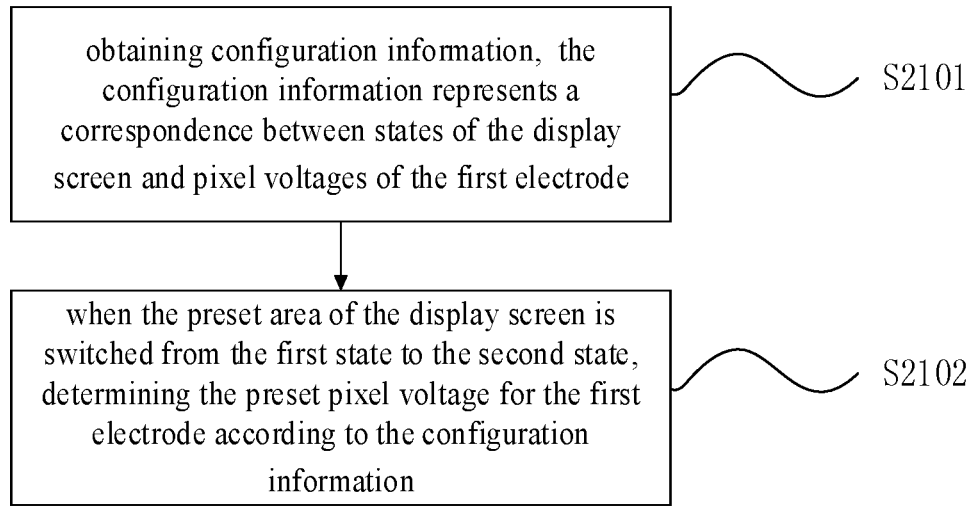
FIG. 8 is a flowchart of a method according to some embodiments.

In some embodiments, as illustrated in FIG. 8, S210 specifically includes the following steps.

At S2101, configuration information is obtained, in which the configuration information represents a correspondence between a state of the display screen and the pixel voltage of the first electrode.

At S2102, when the preset area of the display screen is switched from the first state to the second state, the preset pixel voltage for the first electrode is determined according to the configuration information.

At S2101, the configuration information may be pre-built and stored. For example, according to different display states (different states may refer to different display brightness or color of the display screen), the preset pixel voltage for the first electrode in each state is determined, and a mapping relation is established.

At S2102, when the preset area of the display screen is switched from the first state to the second state, for any state, the preset pixel voltage for the first electrode in this state is directly determined by traversing and querying the configuration information, for example, it is determined that the corresponding preset pixel voltage is Vdata when the white picture is displayed in the second state by query.

Figure 9:
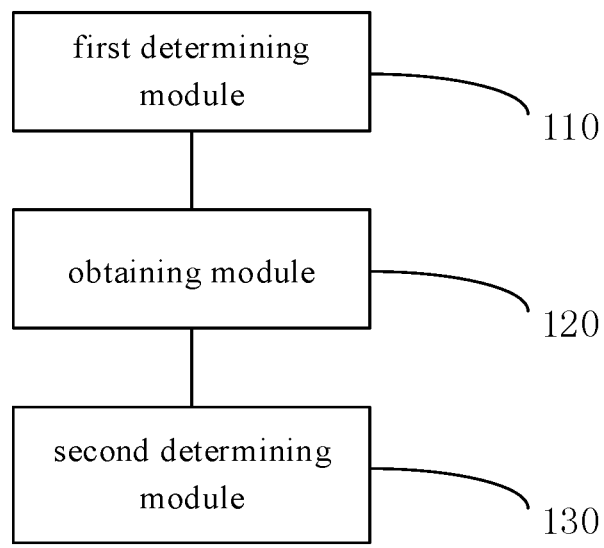
FIG. 9 is a block diagram of an apparatus according to some embodiments.

In some embodiments, this embodiment provides an apparatus for improving a display effect of a display screen, which is applicable for a terminal device including an OLED display screen. As illustrated in FIG. 9, the apparatus includes: a first determining module 110, an obtaining module 120 and a second determining module 130. The first determining module 110 is configured to, determine a current voltage loss of a first electrode at a preset area of the display screen when the preset area of a display screen is switched from a first state to a second state, in which a pixel voltage of the first electrode in the first state is less than a pixel voltage of the first electrode in the second state. The obtaining module 120 is configured to obtain a preset drain voltage for a second electrode at the preset area of the display screen, in which the preset drain voltage for the second electrode is a preset drain voltage of the preset area of the display screen in the second state. The second determining module 130 is configured to determine a target drain voltage of the second electrode of the display screen based on the current voltage loss and the preset drain voltage, and adjust a current drain voltage of the second electrode to the target drain voltage to enable a voltage difference between the first electrode and the second electrode of the display screen to be equal a preset voltage difference.

Figure 10:
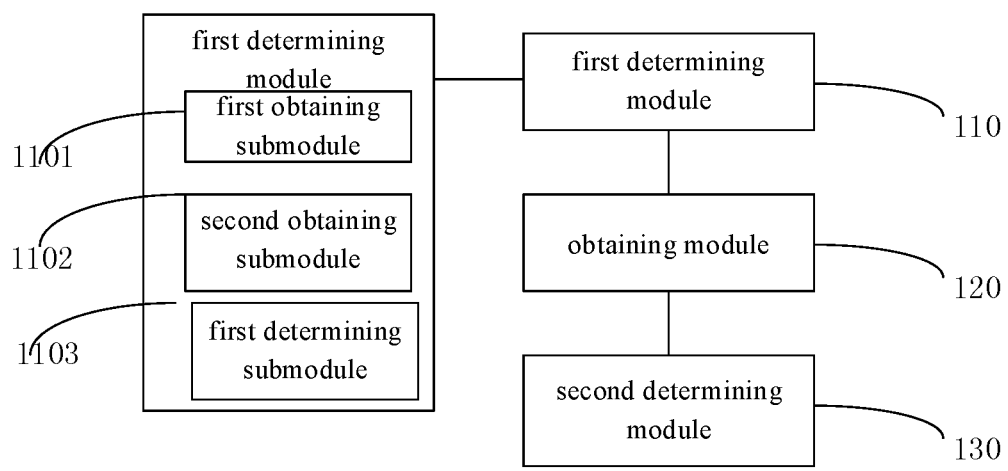
FIG. 10 is a block diagram of an apparatus according to some embodiments.

In some embodiments, an apparatus for improving a display effect of a display screen is provided, which is applicable for a terminal device including an OLED display screen. As illustrated in FIG. 10, the apparatus includes: the first determining module 110, the obtaining module 120 and the second determining module 130. The first determining module 110 includes: a first obtaining submodule 1101, a second obtaining submodule 1102 and a first determining submodule 1103. The apparatus according to this embodiment is configured to implement the method described with reference to FIG. 7. During implementation, the first obtaining submodule 1101 is configured to obtain a preset pixel voltage for the first electrode when a light-emitting component in the preset area is switched from the first state to the second state. The second obtaining submodule 1102 is configured to obtain a current pixel voltage of the first electrode when the light-emitting component in the preset area is switched from the first state to the second state. The first determining submodule 1103 is configured to determine the current voltage loss of the first electrode at the preset area of the display screen based on the preset pixel voltage and the current pixel voltage. The second determining module 130 is further configured to determine a difference between the preset drain voltage and the current voltage loss as the target drain voltage information.

In some embodiments, an apparatus for improving a display effect of a display screen is provided, which is applicable for a terminal device including an OLED display screen. As illustrated in FIG. 10, the apparatus includes: the first determining module 110, the obtaining module 120 and the second determining module 130. The first determining module 110 includes: the first obtaining submodule 1101, the second obtaining submodule 1102 and the first determining submodule 1103. The apparatus according to this embodiment is configured to implement the method described with reference to FIG. 8. During implementation, the first obtaining submodule 1101 is further configured to: obtain configuration information, in which the configuration information represents a correspondence between states of the display screen and pixel voltages of the first electrode; and determine the preset pixel voltage for the first electrode based on the configuration information when the preset area of the display screen is switched from the first state to the second state. The first determining submodule 1103 is further configured to determine a difference between the preset pixel voltage and the current pixel voltage as the current voltage loss of the first electrode of the display screen.

In some embodiments, this embodiment provides a terminal device including the apparatus for improving a display effect of a display screen according to any embodiment.

Figure 11:
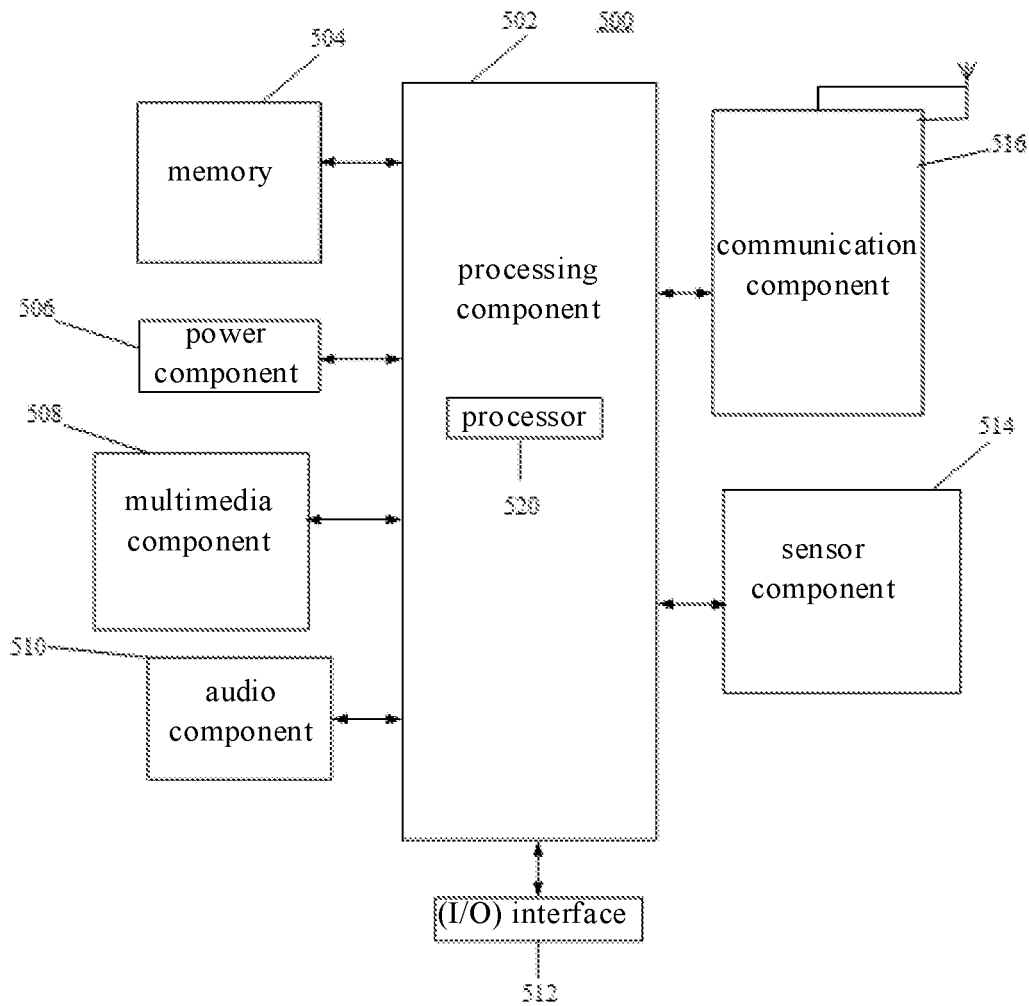
FIG. 11 is a block diagram of an electronic device according to some embodiments.

FIG. 11 is a block diagram of an electronic device according to some embodiments. For example, the device 500 may be a mobile phone, a computer, a digital broadcasting terminal, a message transceiver device, a game console, a tablet device, a medical device, a fitness device and a personal digital assistant.

The device 500 may include one or more of the following components: a processing component 502, memory 504, a power component 506, a multimedia component 508, an audio component 510, an input/output (I/O) interface 512, a sensor component 514, and a communication component 516.

The processing component 502 typically controls overall operations of the apparatus 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the apparatus 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include an LCD screen, an OLED screen, and a touch panel (TP).

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front-facing camera and/or a rear-facing camera. When the apparatus 500 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 510 is configured to output and/or input audio signals. For example, the audio component 510 includes a microphone ("MIC") configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as Wi-Fi, 2G, 3G, 4G, 5G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 520 in the device 500, for performing the above-described methods. For example, the non-transitory computer-readable storage medium may be a ROM, a RAM, a CD-ROM, a magnetic tape, a floppy disc, an optical data storage device, and the like.

The various device components, circuits, units, blocks, or portions may have modular configurations, or are composed of discrete components, but nonetheless can be referred to as "modules," "components," or "circuits" in general. In other words, the "components," "modules," "blocks," "circuits," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A display method, applicable for a terminal device comprising an organic light-emitting diode (OLED) display screen, the method comprising:
   determining a current voltage loss of a pixel electrode of a MOS transistor corresponding to a preset area of the display screen when the preset area of the display screen is switched from a first state to a second state, wherein a pixel voltage of the pixel electrode in the first state is less than a pixel voltage of the pixel electrode in the second state;
   obtaining a preset drain voltage for a drain electrode of the MOS transistor, wherein the preset drain voltage for the drain electrode is a preset drain voltage of the preset area of the display screen in the second state; and
   determining a target drain voltage of the drain electrode based on the current voltage loss and the preset drain voltage, and adjusting a current drain voltage of the drain electrode to the target drain voltage to enable a voltage difference between the first electrode and the second electrode of the display screen to be equal to a preset voltage difference.

2. The method according to claim 1, wherein the determining the current voltage loss of the pixel electrode of the MOS transistor corresponding to the preset area of the display screen when the preset area of the display screen is switched from the first state to the second state comprises:
   obtaining a preset pixel voltage for the pixel electrode when a light emitter in the preset area is switched from the first state to the second state;
   obtaining a current pixel voltage of the pixel electrode when the light emitter in the preset area is switched from the first state to the second state; and
   determining the current voltage loss of the pixel electrode based on the preset pixel voltage and the current pixel voltage.

3. The method according to claim 2, wherein the obtaining the preset pixel voltage for the pixel electrode when the light emitter in the preset area is switched from the first state to the second state comprises:
   obtaining configuration information, wherein the configuration information represents a correspondence between states of the display screen and pixel voltages of the pixel electrode; and
   determining the preset pixel voltage for the pixel electrode based on the configuration information when the preset area of the display screen is switched from the first state to the second state.

4. The method according to claim 2, wherein the determining the current voltage loss of the pixel electrode based on the preset pixel voltage and the current pixel voltage comprises:
   determining a difference between the preset pixel voltage and the current pixel voltage as the current voltage loss of the pixel electrode.

5. The method according to claim 1, wherein the determining the target drain voltage of the drain electrode based on the current voltage loss and the preset drain voltage comprises:
   determining a difference between the preset drain voltage and the current voltage loss as the target drain voltage.

6. A terminal device, comprising:
   a processor;

memory configured to store instructions executable by the processor; wherein the processor is configured to execute steps of a display method, the method comprising:

determining a current voltage loss of a pixel electrode of a MOS transistor corresponding to a preset area of the display screen when the preset area of the display screen is switched from a first state to a second state, wherein a pixel voltage of the pixel electrode in the first state is less than a pixel voltage of the pixel electrode in the second state;

obtaining a preset drain voltage for a drain electrode of the MOS transistor, wherein the preset drain voltage for the drain electrode is a preset drain voltage of the preset area of the display screen in the second state; and determining a target drain voltage of the drain electrode based on the current voltage loss and the preset drain voltage, and adjusting a current drain voltage of the drain electrode to the target drain voltage to enable a voltage difference between the first electrode and the second electrode of the display screen to be equal to a preset voltage difference.

7. The terminal device according to claim 6, wherein the determining the current voltage loss of the pixel electrode of the MOS transistor corresponding to the preset area of the display screen when the preset area of the display screen is switched from the first state to the second state comprises:

obtaining a preset pixel voltage for the pixel electrode when a light emitter in the preset area is switched from the first state to the second state;

obtaining a current pixel voltage of the pixel electrode when the light emitter in the preset area is switched from the first state to the second state; and determining the current voltage loss of the pixel electrode based on the preset pixel voltage and the current pixel voltage.

8. The terminal device according to claim 7, wherein the obtaining the preset pixel voltage for the pixel electrode when the light emitter in the preset area is switched from the first state to the second state comprises:

obtaining configuration information, wherein the configuration information represents a correspondence between states of the display screen and pixel voltages of the pixel electrode; and determining the preset pixel voltage for the pixel electrode based on the configuration information when the preset area of the display screen is switched from the first state to the second state.

9. The terminal device according to claim 7, wherein the determining the current voltage loss of the pixel electrode based on the preset pixel voltage and the current pixel voltage comprises:

determining a difference between the preset pixel voltage and the current pixel voltage as the current voltage loss of the pixel electrode.

10. The terminal device according to claim 6, wherein the determining the target drain voltage of the drain electrode based on the current voltage loss and the preset drain voltage comprises:

determining a difference between the preset drain voltage and the current voltage loss as the target drain voltage.

11. The terminal device according to claim 6, further comprising the display screen and a touch panel.

12. The terminal device according to claim 11, wherein the display screen is an organic light-emitting diode (OLED) display touch screen.

13. The terminal device according to claim 12, wherein the terminal device is configured to adaptively adjust the current drain voltage of the drain electrode based on the current voltage loss of the pixel electrode when the preset area changes states.

14. The terminal device according to claim 13, wherein the terminal device is configured to ensure a voltage difference between two electrodes corresponding to the preset area to be at the preset voltage difference, thereby ensuring sufficient drive current for the display screen and reduce a display smear effect.

15. A non-transitory computer-readable storage medium storing instructions, wherein when the instructions in the storage medium are executed by a processor of a terminal device, the terminal device is caused to execute a display method, the method comprising:

determining a current voltage loss of a pixel electrode of a MOS transistor corresponding to a preset area of the display screen when the preset area of the display screen is switched from a first state to a second state, wherein a pixel voltage of the pixel electrode in the first state is less than a pixel voltage of the pixel electrode in the second state;

obtaining a preset drain voltage for a drain electrode of the MOS transistor, wherein the preset drain voltage for the drain electrode is a preset drain voltage of the preset area of the display screen in the second state; and determining a target drain voltage of the drain electrode based on the current voltage loss and the preset drain voltage, and adjusting a current drain voltage of the drain electrode to the target drain voltage to enable a voltage difference between the first electrode and the second electrode of the display screen to be equal to a preset voltage difference.

16. The non-transitory computer-readable storage medium according to claim 15, wherein the determining the current voltage loss of the pixel electrode of the MOS transistor corresponding to the preset area of the display screen when the preset area of the display screen is switched from the first state to the second state comprises:

obtaining a preset pixel voltage for the pixel electrode when a light emitter in the preset area is switched from the first state to the second state;

obtaining a current pixel voltage of the pixel electrode when the light emitter in the preset area is switched from the first state to the second state; and determining the current voltage loss of the pixel electrode based on the preset pixel voltage and the current pixel voltage.

17. The non-transitory computer-readable storage medium according to claim 16, wherein the obtaining the preset pixel voltage for the pixel electrode when the light emitter in the preset area is switched from the first state to the second state comprises:

obtaining configuration information, wherein the configuration information represents a correspondence between states of the display screen and pixel voltages of the pixel electrode; and determining the preset pixel voltage for the pixel electrode based on the configuration information when the preset area of the display screen is switched from the first state to the second state.

18. The non-transitory computer-readable storage medium according to claim 16, wherein the determining the current voltage loss of the pixel electrode based on the preset pixel voltage and the current pixel voltage comprises:

determining a difference between the preset pixel voltage and the current pixel voltage as the current voltage loss of the pixel electrode.

19. The non-transitory computer-readable storage medium according to claim 15, wherein the determining the target drain voltage of the drain electrode based on the current voltage loss and the preset drain voltage comprises:
determining a difference between the preset drain voltage and the current voltage loss as the target drain voltage.

* * * * *